(12) United States Patent
Singh et al.

(10) Patent No.: US 10,949,234 B2
(45) Date of Patent: Mar. 16, 2021

(54) DEVICE PASS-THROUGH FOR VIRTUALIZED ENVIRONMENTS

(71) Applicant: Cisco Technology, Inc., San Jose, CA (US)

(72) Inventors: Akshya Kumar Singh, San Jose, CA (US); Aeneas Sean Dodd-Noble, San Jose, CA (US); Anil Kumar Chandrupatla, San Jose, CA (US); Jay Edward Lubomirski, San Jose, CA (US); Prasannakumar Murugesan, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 148 days.

(21) Appl. No.: 15/290,828

(22) Filed: Oct. 11, 2016

(65) Prior Publication Data
US 2018/0101396 A1    Apr. 12, 2018

(51) Int. Cl.
*G06F 9/455* (2018.01)
*H04L 12/24* (2006.01)
*G06F 9/4401* (2018.01)

(52) U.S. Cl.
CPC ........ *G06F 9/45558* (2013.01); *G06F 9/4401* (2013.01); *H04L 41/0806* (2013.01); *G06F 2009/45579* (2013.01); *G06F 2009/45595* (2013.01)

(58) Field of Classification Search
CPC ............. G06F 9/45558; G06F 9/45533; G06F 2009/45579; G06F 9/44505; G06F 9/5077; G06F 13/102; G06F 13/385; G06F 2009/45595; G06F 2213/3808; G06F 9/4416; H04L 41/0806
See application file for complete search history.

(56) References Cited

U.S. PATENT DOCUMENTS

| | | | | |
|---|---|---|---|---|
| 5,923,850 A | * | 7/1999 | Barroux | H04L 41/0213 709/223 |
| 7,239,629 B1 | * | 7/2007 | Olshansky | H04Q 3/0045 370/353 |
| 8,538,919 B1 | * | 9/2013 | Nielsen | G06F 9/5077 380/277 |
| 9,286,093 B1 | * | 3/2016 | Yin | G06F 9/45558 |
| 2003/0069960 A1 | * | 4/2003 | Symons | H04L 41/085 709/224 |

(Continued)

*Primary Examiner* — Dong U Kim
(74) *Attorney, Agent, or Firm* — Polsinelli PC

(57) ABSTRACT

Systems, methods, and computer-readable storage media for network association to virtualize network devices using device passthrough. In some examples, a system can determine one or more respective configuration parameters associated with one or more network interfaces on the system. Based on the networking information, the system can map the one or more respective configuration parameters to each corresponding network interface from the one or more network interfaces, to yield mapped interfaces-parameters. Next, the system can record the mapped interfaces-parameters to a data object accessible by a virtual machine on the system. The system can then configure the virtual machine to process the mapped interfaces-parameters as boot time parameters while spawning and launch the virtual machine based on the mapped interfaces-parameters.

20 Claims, 6 Drawing Sheets

(56) References Cited

U.S. PATENT DOCUMENTS

| | | | |
|---|---|---|---|
| 2006/0155838 A1* | 7/2006 | Wu | G06F 9/4416 709/223 |
| 2009/0249213 A1* | 10/2009 | Murase | H04L 41/12 715/735 |
| 2010/0085975 A1* | 4/2010 | Wang | H04L 69/08 370/395.53 |
| 2010/0169467 A1* | 7/2010 | Shukla | H04L 41/12 709/220 |
| 2010/0257346 A1* | 10/2010 | Sosnosky | H04L 67/1095 713/2 |
| 2011/0265164 A1* | 10/2011 | Lucovsky | G06F 9/45533 726/7 |
| 2011/0320799 A1* | 12/2011 | Lam | G06F 8/63 713/2 |
| 2012/0023230 A1* | 1/2012 | Hosking | H04L 41/12 709/224 |
| 2012/0144391 A1* | 6/2012 | Ueda | G06F 9/45558 718/1 |
| 2012/0246282 A1* | 9/2012 | Oguchi | H04L 12/66 709/221 |
| 2012/0265976 A1* | 10/2012 | Spiers | H04L 63/0218 713/2 |
| 2015/0058837 A1* | 2/2015 | Govindankutty | G06F 9/45533 718/1 |
| 2015/0089292 A1* | 3/2015 | Ueda | G06F 11/263 714/33 |
| 2015/0113132 A1* | 4/2015 | Srinivas | H04L 41/0816 709/224 |
| 2016/0089292 A1* | 3/2016 | Albanese | A61G 13/06 128/845 |
| 2016/0239326 A1* | 8/2016 | Kaplan | G06F 9/45533 |
| 2016/0321112 A1* | 11/2016 | Iwashina | G06F 9/5072 |

\* cited by examiner

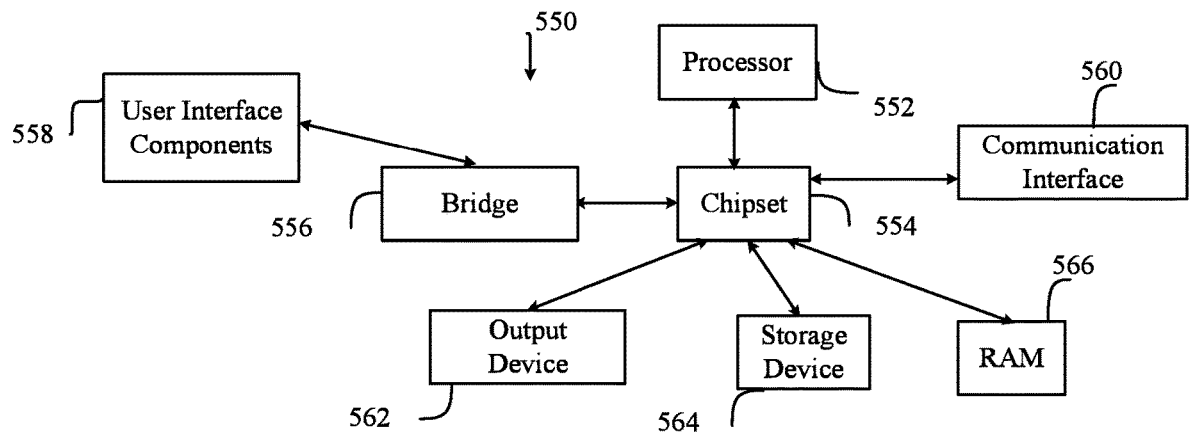
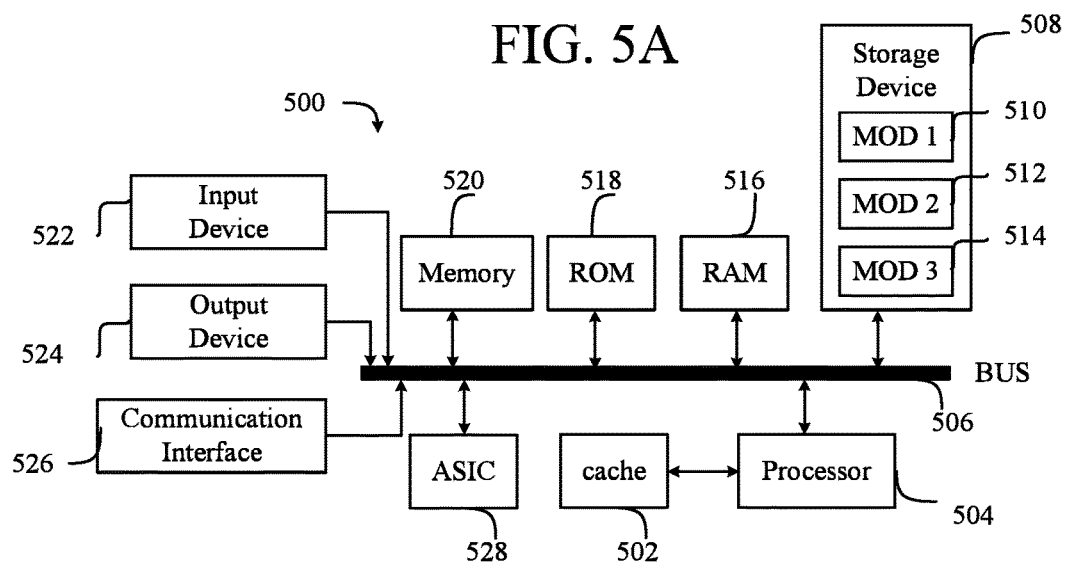

DEVICE PASS-THROUGH FOR VIRTUALIZED ENVIRONMENTS

TECHNICAL FIELD

The present technology pertains to device pass-through, and more specifically, the present technology involves pass-through of device parameters for devices in a virtualized environment.

BACKGROUND

Today, virtualization is widely used in datacenters. Virtualization facilitates the management of the datacenter and deployment of service applications. There are currently numerous tools—including software containers, virtual machines, and hypervisors—to enable virtualization and help simplify the management and deployment of datacenter resources. Virtual machines and software containers are very common tools for creating virtualized environments.

Both virtual machines and software containers require the underlying system to provision specific resources such as a disk, memory, processor, network devices, and other hardware components. Unfortunately, when provisioning specific resources, such as network interfaces, the system is unable to pass various types of information or parameters about the provisioned resources which may be needed by the virtualized environment and the services or applications running in the virtualized environment. As a result, administrators often have to manually set the specific information or parameters for the provisioned resources on the virtual machine. However, this process can be extremely onerous and often unmanageable, particularly in large datacenters.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5A and FIG. 5B illustrate example system embodiments.

DESCRIPTION OF EXAMPLE EMBODIMENTS

Figure 1A:
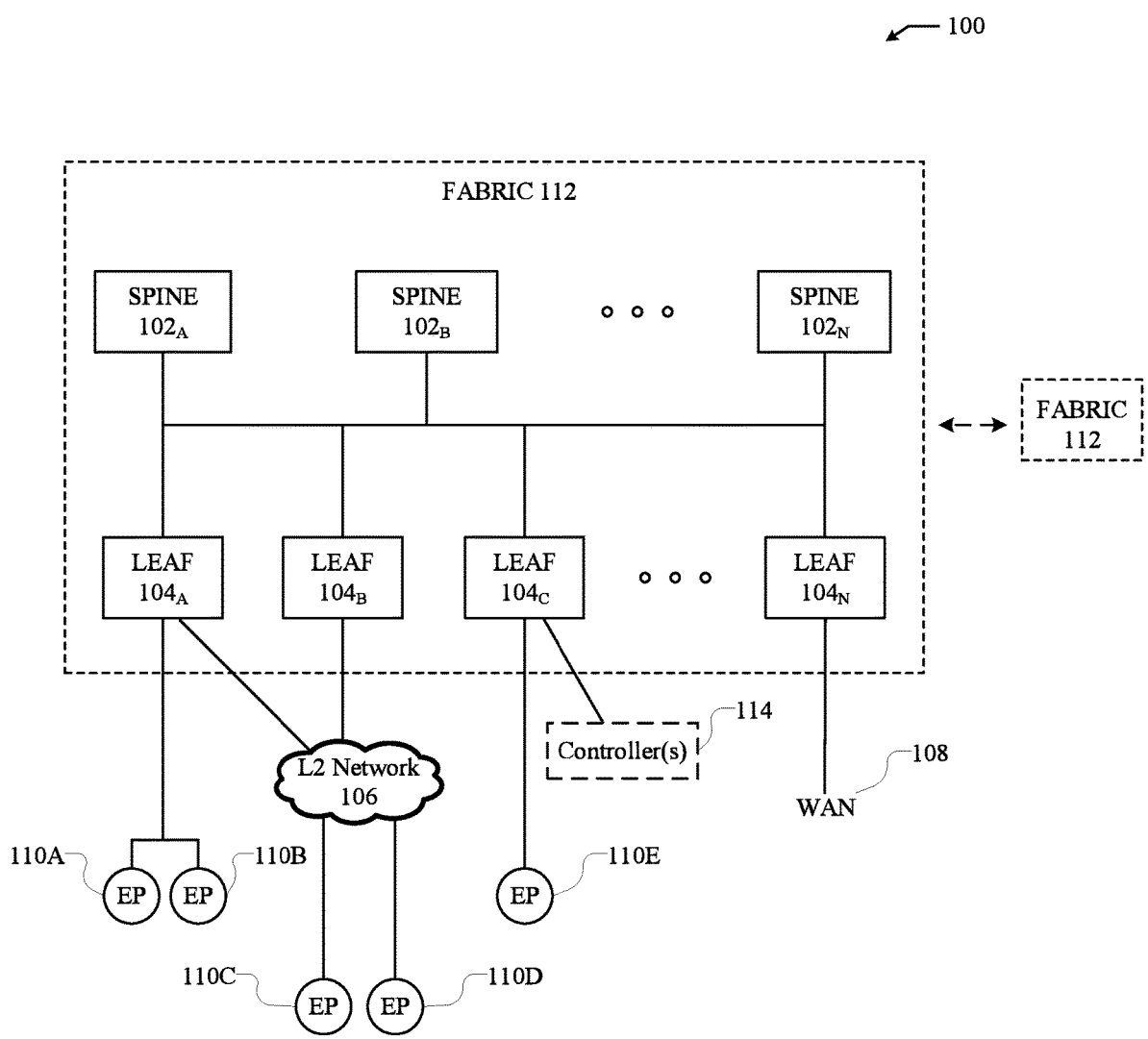
FIG. 1A illustrates a schematic diagram of an example network environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can enable device pass-through for virtual environments such as virtual machines or software containers (e.g., LINUX CONTAINERS). For example, device information and settings can be passed to the VM to allow the VM to configure or modify specific devices according to the device information. The approaches herein can also allow the system to pass network information and/or device data to the virtualized environment (e.g., Virtual Machine) for configuring specific device(s) accordingly. To illustrate, the system can pass data identifying a type of network and/or describing the network associated with a particular network interface (e.g., network interface card) to a virtual machine. When the virtual machine launches and configures the network interface, it can associate the network interface with the network and/or include an indication of the network or type of network associated with the network interface. This can allow, for example, the virtual machine to bind one or more application specific services to the particular network interface.

Disclosed are systems, methods, and computer-readable storage media for network association to virtualize network devices using device passthrough. In some embodiments, an example system can determine respective configuration parameters associated with one or more network interfaces on the system. Based on the networking information, the system can map the respective configuration parameters to each corresponding network interface from the one or more network interfaces, to yield mapped interfaces-parameters. The system can also record the mapped interfaces-parameters to a data object accessible by a virtual machine on the system. The data object can be, for example, a file or any data structure.

The system can configure the virtual machine to process the mapped interfaces-parameters as boot time parameters while launching. For example, the system can configure the virtual machine to detect and read the mapped interfaces-parameters and process the mapped interfaces-parameters as boot parameters at boot time. The mapped interfaces-parameters can allow the virtual machine to configure the one or more respective network interfaces and/or pass parameters to the respective network interfaces.

The system can then launch the virtual machine according to the boot parameters. The boot parameters can cause the virtual machine to configure the respective network interfaces according to the mapped interfaces-parameters and/or apply specific settings defined by the mapped interfaces-parameters.

Description

Figure 1B:
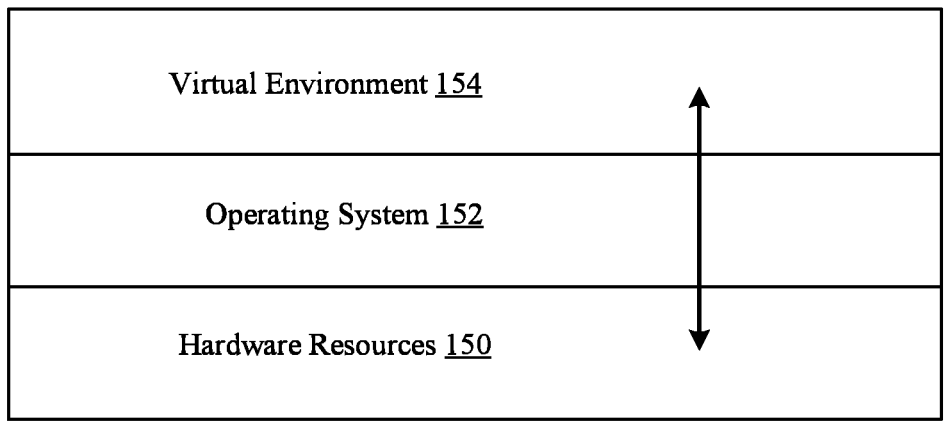
FIG. 1B illustrates a schematic diagram of an example endpoint running a virtual environment.
Figure 2:
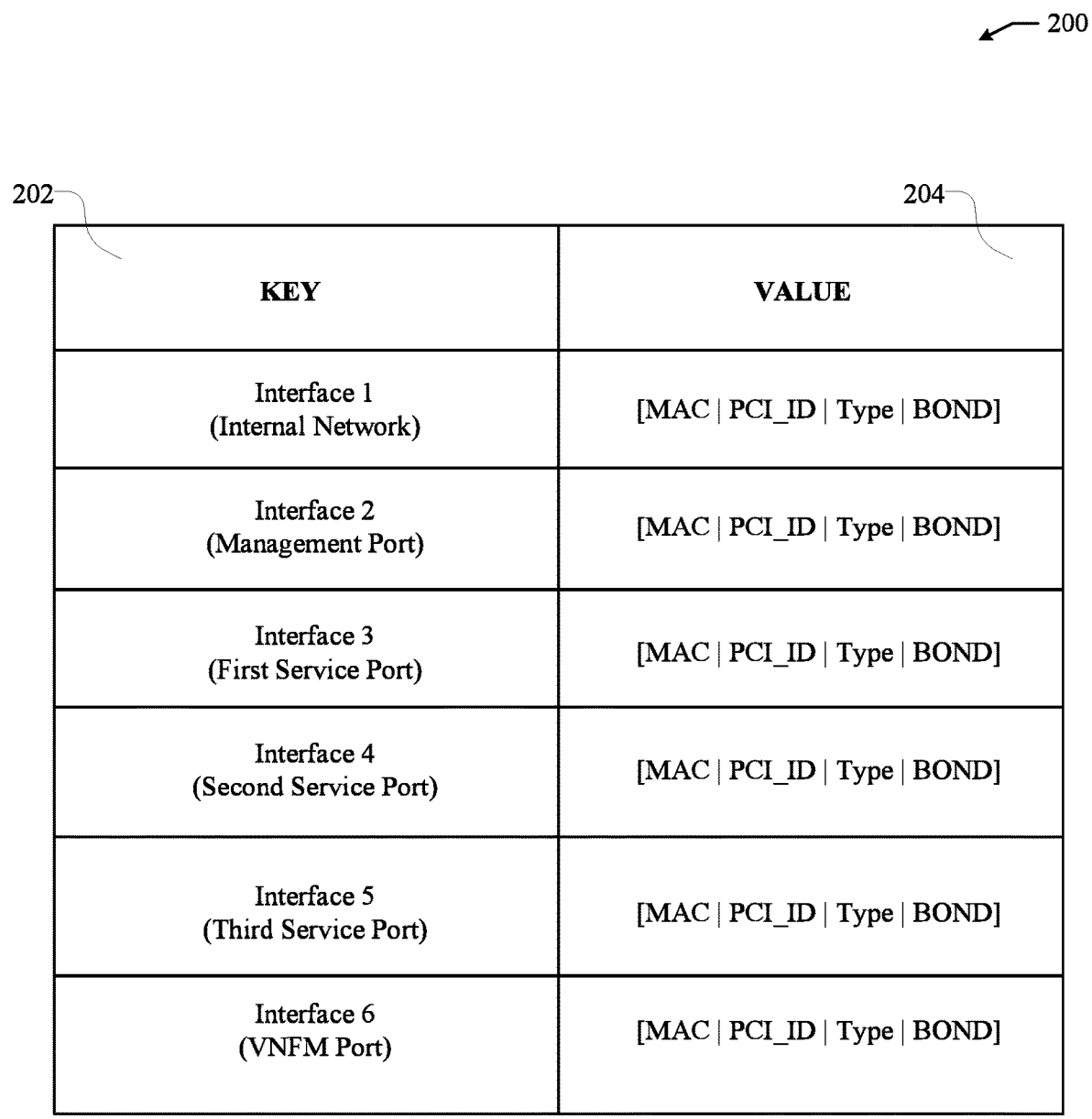
FIG. 2 illustrates an example table for pass-through key-value pairs.
Figure 3:
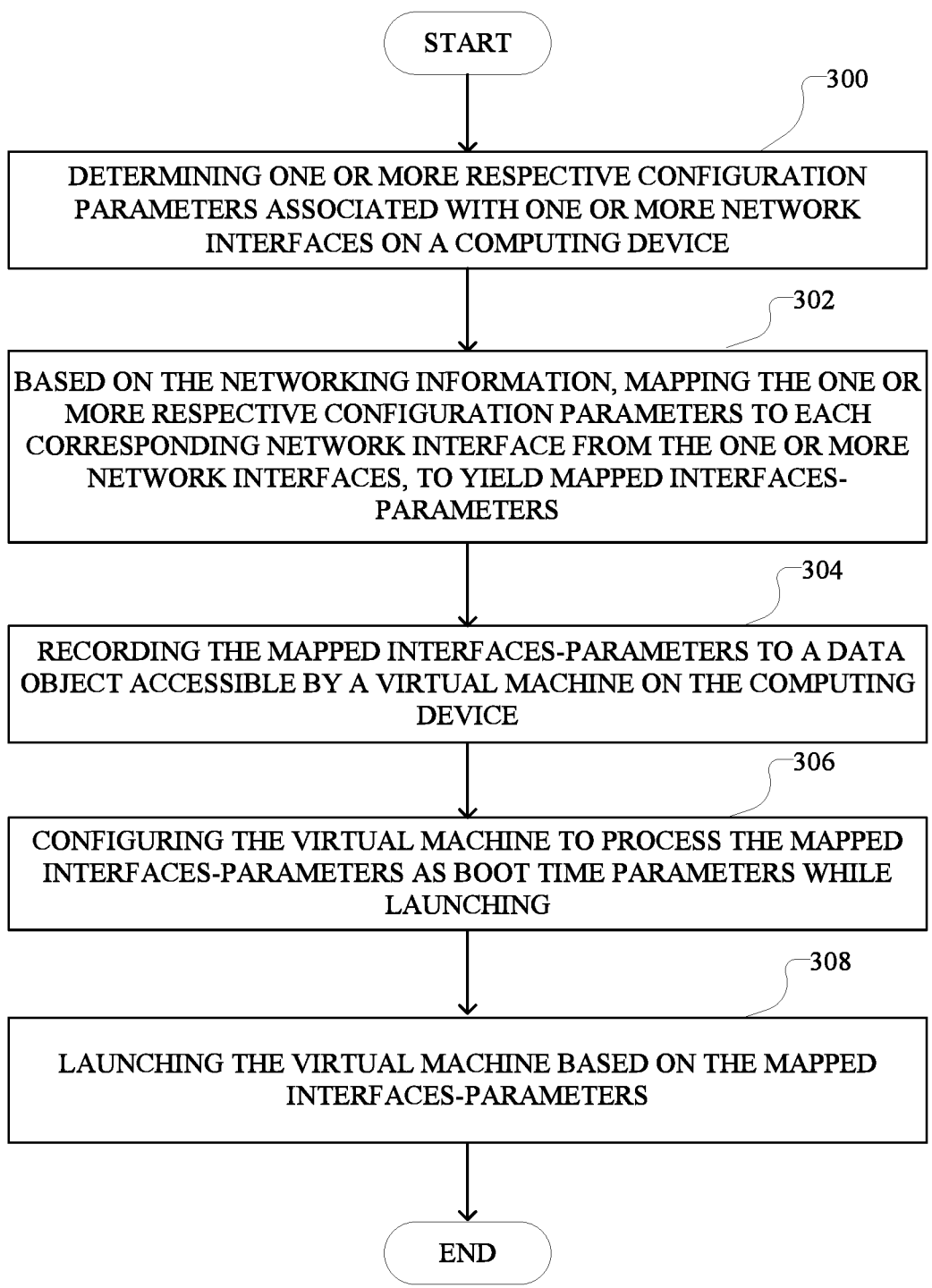
FIG. 3 illustrates an example method.
Figure 4:
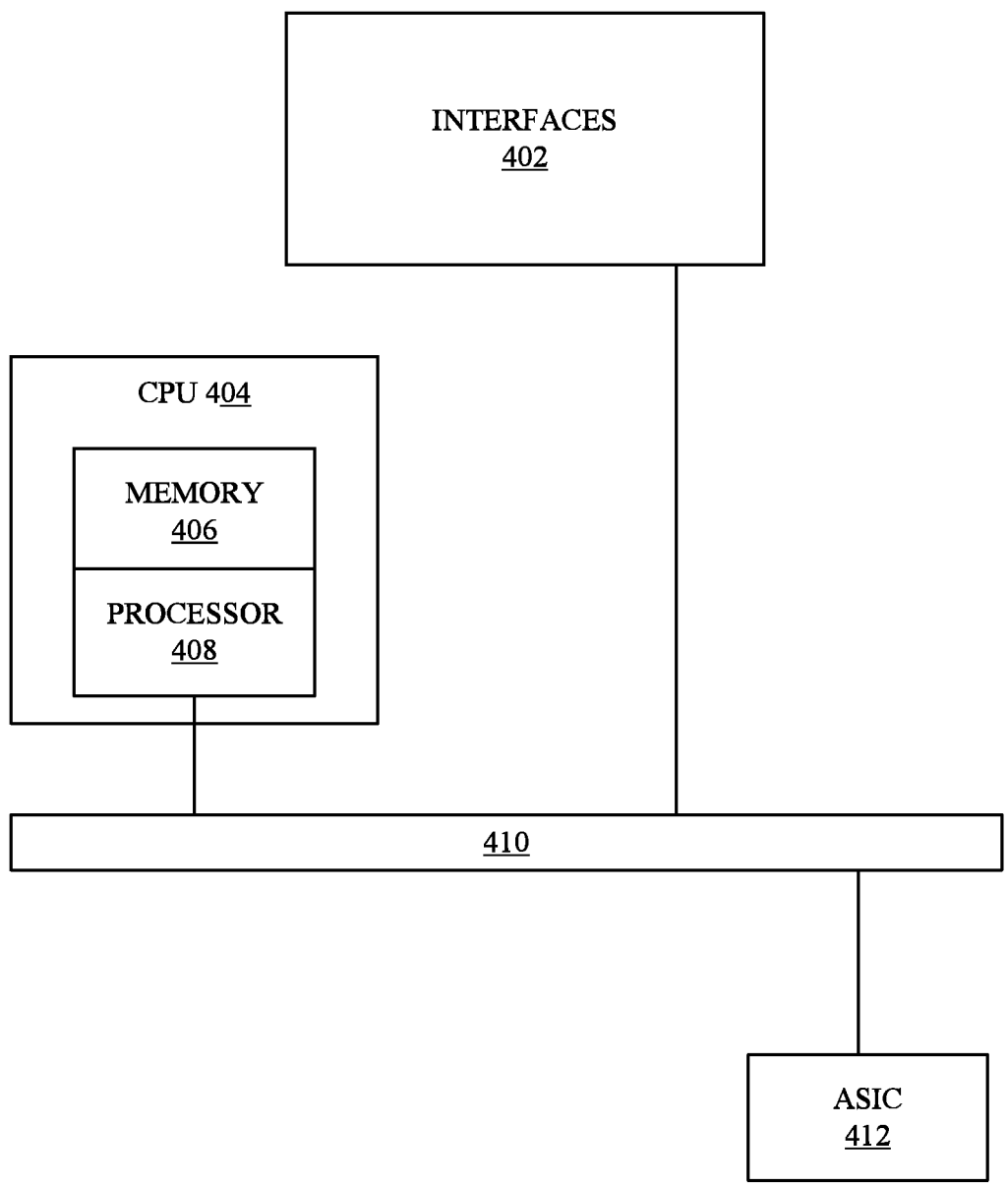
FIG. 4 illustrates and example network device.

The disclosed technology addresses the need in the art for accurate, efficient, and complete device pass-through in virtualized environments. The present technology involves system, methods, and computer-readable media for device pass-through in virtualized environments. A description of example network environments and virtual systems, as illustrated in FIGS. 1A and 1B, is first disclosed herein. A discussion of device pass-through in virtualized environments, as illustrated in FIGS. 2-4, will then follow. The discussion then concludes with a brief description of example computing devices, as illustrated in FIGS. 5A-B. These variations shall be described herein as the various embodiments are set forth. The disclosure now turns to FIG. 1A.

FIG. 1A illustrates a schematic block diagram of an example network architecture 100. The architecture 100 includes a network fabric 112 with spine switches 102A, 102B, . . . , 102N (collectively "102") connected to leaf switches 104A, 104B, 104C, . . . , 104N (collectively "104") in the network fabric 112.

Spine switches 102 can be Layer 3 ("L3") and/or Layer 2 ("L2") switches in the fabric 112. Spine switches 102 connect to leaf switches 104 in the fabric 112. Leaf switches 104 can include access ports (or non-fabric ports) and fabric ports. Fabric ports can provide uplinks to the spine switches 102, while access ports can provide connectivity for devices, hosts, endpoints, VMs, or external networks to the fabric 112.

Leaf switches 104 can reside at the boundary between the fabric 112 and the tenant or customer space. In some cases, the leaf switches 104 can be top-of-rack ("ToR") switches, aggregation switches, end-of-row (EoR), middle-of-row (MoR) switches, etc.

The leaf switches 104 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 104 can contain virtual switching and/or tunneling functionalities, such as a virtual tunnel endpoint (VTEP) function to support an overlay network (e.g., VxLAN, etc.) over the network underlay (i.e., fabric 112). Thus, leaf switches 104 can connect the fabric 112 to an overlay and/or software-defined network.

Network connectivity in the fabric 112 can flow through the leaf switches 104. The leaf switches 104 can provide servers, resources, endpoints, external networks, or VMs access to the fabric 112, and can connect the leaf switches 104 to each other. In some cases, the leaf switches 104 can connect endpoint groups ("EPGs") to the fabric 112 and/or any external networks. Each EPG can connect to the fabric 112 via one or more of the leaf switches 104, for example.

Endpoints 110A-E (collectively "110") can connect to the fabric 112 via leaf switches 104. For example, endpoints 110A and 110B can connect directly to leaf switch 104A, which can connect endpoints 110A and 110B to the fabric 112 and/or any other of the leaf switches 104. Similarly, endpoint 110E can connect directly to leaf switch 104C, which can connect endpoint 110E to the fabric 112 and/or any other of the leaf switches 104. On the other hand, endpoints 110C and 110D can connect to leaf switch 104B via L2 network 106. Moreover, the wide area network (WAN) 108 can connect to the leaf switches 104N.

Endpoints 110 can include any communication device, such as a computer, a server, a switch, etc. In some cases, the endpoints 110 can include a server or switch configured with a virtual tunnel endpoint functionality which connects an overlay network with the fabric 112. For example, in some cases, the endpoints 110 can represent hosts (e.g., servers) with virtual tunnel endpoint capabilities, and running virtual environments (e.g., hypervisor, virtual machine(s), containers, etc.). An overlay network associated with the endpoints 110 can host physical devices, such as servers; applications; EPGs; virtual segments; virtual workloads; etc. Likewise, endpoints 110 can also host virtual workloads and applications, which can connect with the fabric 112 or any other device or network, including an external network.

The architecture 100 can also include other types of devices, such as controllers 114, which can connect to the fabric 112 in order to perform particular services, such as management or monitoring services, for example.

FIG. 1B illustrates an endpoint 110A hosting a virtual environment. The endpoint 110A can be a computing device, such as a server or a switch, for example. The endpoint 110A can include a layer of hardware resources 150, such as one or more processors, memories, disks, peripheral components, network interfaces, input devices, output devices, etc. The endpoint 110A can also include an operating system layer 152, which can include a host operating system which communicates with, and/or manages, the hardware resources layer 150. The endpoint 110A can host a virtual environment layer 154 which can communicate with the hardware resources layer 150 and/or operating system layer 152.

The virtual environment layer 154 can include, for example, a software container (e.g., LINUX CONTAINER), a VM, a hypervisor, etc. In some cases, the virtual environment 154 can communicate with the hardware layer 150 and the operating system layer 152. The virtual environment 154 can communicate with the hardware layer 150 directly or via the operating system layer 152. In some cases, the virtualized environment layer 154 can run one or more guest operating systems. However, in other cases, the virtualized environment layer 154 may run on top of the operating system layer 152 without a guest operating system.

Having disclosed an example network environment and a virtual environment, the disclosure now turns to an overview of device pass-through in a virtualized environment.

Virtualized environments are typically provided by virtual machines (VMs) or software containers, such as LINUX CONTAINERS (LXC), depending on particular use-cases and application complexity. Both VMs and software containers require specific resources provisioned by the underlying system, such as disk resources, networking devices, memory, processor(s), and so forth.

There are several ways to provision hardware devices, such as networking devices, to a virtual machine. Non-limiting examples include emulating hardware devices into hypervisor, emulating hardware devices into guest operating system, using a PCI pass-through mechanism or SR-IOV (single root input/output virtualization) capabilities of specific devices.

PCI-Pashtrhough and SR-IOV can greatly help improve the performance of the provisioned device. Hence, many times, device pass-through can be beneficial when provisioning network devices, such as network interfaces, to achieve greater throughput from the physical network devices. However, with device pass-through, some information is not passed to the virtualized environment for the provisioned device.

For example, an application in a virtualized environment often needs to explicitly know the network associated with the physical network interfaces within the VM, such as labels as often defined when configuring the actual physical devices. Such information may advantageously enable specific applications running within the VM bind to the right set of services.

When a network interface is attached to a VM using device pass-through, the hypervisor simply maps the physical addresses of the device into the VM, and the VM can then detect the network interface as another PCI (peripheral component interconnect) device, for example. Notably, when enabling this PCI pass-through, there is no other information associated with the network interface passed to the VM. This can create various deployment issues.

Accordingly, as explained herein, device pass-through can be modified or expanded to enable additional information to be passed to the VM for provisioned devices. For example, a tag including, without limitation, a key:value pair can be used to map and pass information to the VM. In this example, the key can include an identifier associated with the respective device, such as a media access control (MAC) address of the specific pass-through device, and the value can provide information for the specific pass-through devices. To illustrate, the key can include a MAC address of a network interface and the value can include associated networking information, such as a description or label of the network associated with the network interface.

These example tags can be passed to the VM as boot time parameters while spawning or launching the VM. This way, any application running within the VM can have information in advance about the network interface and associated network, so they can bind the services required for the specific network associated with the network interface.

Some applications need to know the network associated with a network interface or port in advance. In some cases, it is important for an application to know the network association before provisioning services or performing a network discovery, such as a DHCP request.

While the examples provided herein focus on network devices as the pass-through devices and network information as the pass-through information, other types of device and information are also contemplated herein. Indeed, the approaches herein can be implemented to pass to a VM or software container any type of information for any type of device, such as any interface or component, including para-virtual interfaces, SR-IOV (single root input/output virtualization) components, PCI components, PCIe components, etc.

The disclosure now turns to FIG. 2, which illustrates a table 200 with example key-value pairs for pass-through parameters. The table 200 can include a pass-through key 202 for one or more interfaces, components or ports and identifying values 204 for the one or more interfaces, components or ports. The identifying values 204 can be used to identify the one or more interfaces, components or ports, and map the pass-through keys 202 to the virtualized environment (e.g., software container, VM, etc.) for the specific interfaces, components or ports represented by the identifying values 204.

Accordingly, the identifying values 204 can include, without limitation, a hardware address, such as a MAC address; a hardware or interface identifier, such as a PCI identifier; a descriptor, such as a type, a driver name and/or an instance number; or a bonded network configuration description, which contains identifying values for the bonded slave interfaces, connection or configuration (e.g., slave interface A, slave interface B, etc.); and so forth.

The pass-through keys 202 can include any keys or values that should be mapped to the interfaces, components, or ports represented by the identifying values 204. For example, the pass-through keys 202 can include data describing a type or role of the interfaces, components or ports, a type or role of one or more networks associated with the interfaces, components, or ports, etc. To illustrate, a pass-through key 202 can include a label, such as Interface 1, and a description of the role of the interface and/or the network associated with the interface, such as Internal Network to indicate that the interface is associated with the internal network, Management Port to indicate the interface is a management port, a Service Port, to indicate that the interface is a specific service port, a VNFM (virtual network functions manager) port to indicate that the interface is a VNFM, etc.

In some cases, the pass-through key 202 can include a label as previously described as well as data associating the label with additional information such as a type or role of the associated interface, component or port, or an association of the interface, component or port with a particular network. In other cases, the label itself can provide a description of the type or role of the associated interface, component or port, or a description of the particular network associated with the interface, component or port.

The pass-through keys 202 and identifying values 204 can be mapped and provided to a VM as boot time parameters. The VM can thus read the mappings of pass-through keys 202 and identifying values 204 and configure the associated interfaces, components or ports accordingly during booting or spawning. This way, the VM can launch with the interfaces, components or ports automatically configured according to the parameters, based on the pass-through keys 202 and identifying values 204, passed to the VM as boot time parameters.

The pass-through keys 202 and identifying values 204 can be provided as tags with key-value pairs for the VM. Moreover, the pass-through keys 202 and identifying values 204 can be provided to the VM via a data object, such as a file, a memory, etc. For example, the pass-through keys 202 and identifying values 204 can be provided in a file which the VM can read at boot time. To illustrate, the pass-through keys 202 and identifying values 204 can be provided in a file which the VM can read as a bootable CD drive, which can then pass the information or parameters to the VM as boot parameters for example.

Having disclosed some basic system components and concepts, the disclosure now turns to the example method shown in FIG. 3. For the sake of clarity, the method is described in terms of the endpoint 110A, as shown in FIGS. 1A and 1B, configured to perform the method. The steps outlined herein are exemplary and can be implemented in any combination thereof, including combinations that exclude, add, or modify certain steps.

At step 300, the endpoint 110A can determine one or more respective configuration parameters associated with one or more network interfaces associated with the endpoint 110A. In some cases, the one or more network interfaces can by physical network interfaces, such as network interface cards or ports. The one or more network interfaces can be assigned or configured according to the respective parameters on the endpoint 110A. Accordingly, the endpoint 110A can determine those parameters in order to pass such parameters to a virtualized environment on the endpoint 110A as further described herein.

The one or more respective configuration parameters can identify, for example, a network associated with each of the one or more network interfaces, a type of network associated with the one or more network interfaces, a network or service role of the one or more network interfaces, security or hardware conditions, network addressing information, network or interface descriptions, etc.

At step 302, the endpoint 110A can map, based on the networking information, the one or more respective configuration parameters to each corresponding network interface from the one or more network interfaces, to yield mapped interfaces-parameters. The mapped interfaces-parameters can be key and value pairs as described herein with reference to FIG. 2.

To create the mapped interfaces-parameters, the endpoint 110A can map respective configuration parameters to respective network interfaces. The respective network interfaces can be identified in the mapped interfaces-parameters by respective network or hardware addresses (e.g., MAC address, PCI identifier, etc.), a type of network interface (e.g., management interface, service interface, etc.), a description of the network interfaces (e.g., interface for network A, etc.), a network interface identifier, etc. Thus, the mapped interfaces-parameters can map the one or more respective configuration parameters with respective network interfaces based on any of the information identifying or describing the particular network interfaces to be mapped to the respective configuration parameters.

At step 304, the endpoint 110A can record the mapped interfaces-parameters to a data object accessible by a virtual machine on the endpoint 110A. For example, the mapped interfaces-parameters can be recorded in a file or disk accessible by the virtual machine. In some cases, the file can be configured as a disk drive of the virtual machine, which the virtual machine can read while booting and/or thereafter.

At step 306, the endpoint 110A can configure the virtual machine to process the mapped interfaces-parameters as boot time parameters while launching. For example, the endpoint 110A can configure the virtual machine to read the mapped interfaces-parameters from the data object and apply the mapped interfaces-parameters during or after boot time.

At step 308, the endpoint 110A can launch the virtual machine based on the mapped interfaces-parameters. The endpoint 110A can apply the mapped interfaces-parameters while configuring the virtual machine at boot time or after boot time. This way, the endpoint 110A can pass the mapped interfaces-parameters to the virtual machine to enable the virtual machine to automatically configure the network interfaces on the virtual machine according to the mapped interfaces-parameters.

For example, the virtual machine can automatically obtain a network name or type associated with a network interface from the mapped interfaces-parameters, and automatically apply the network name or type to the network interface when configuring the network interface to ensure that the specific parameters are associated with the network interface within the virtual machine environment. This can allow the virtual machine environment to identify the parameters associated with the network interface, such as the network or role associated with the network interface, in order to bind the proper applications or services to the network interface based on the associated network parameters.

In some cases, the one or more network interfaces can include various network interfaces which can be associated with different networks, roles, etc. The virtual machine can thus use the mapped interfaces-parameters to map information and parameters to the different network interfaces within the virtual machine environment. For example, the network interfaces can be associated with a management role or network, a service role or network, an internal network, a data traffic processing role, etc. Any of this information can be passed by the endpoint 110A to the virtual machine so the information is assigned or mapped to the various network interfaces within the virtual machine environment.

While the method in FIG. 3 is described with reference to a virtual machine and one or more network interfaces, the method can also be implemented with other virtualized environments, such as software containers, and other components, such as disks, memory devices, processors, and other hardware. For example, the method can be implemented to pass parameters associated with a memory device to a virtualized environment, such as a software container or virtual machine, so the parameters can be applied to the memory device within the virtualized environment.

The disclosure now turns to FIGS. 4 and 5A-B, which illustrate example devices.

FIG. 4 illustrates an example network device 400 suitable for performing switching, port identification, and/or port verification operations. Network device 400 includes a master central processing unit (CPU) 404, interfaces 402, and a bus 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. CPU 404 may include one or more processors 408 such as a processor from the Intel or Motorola family of microprocessors or the MIPS family of microprocessors. In an alternative embodiment, processor 408 is specially designed hardware for controlling the operations of network device 400. In a specific embodiment, a memory 406 (such as non-volatile RAM, a TCAM, and/or ROM) also forms part of CPU 404. However, there are many different ways in which memory could be coupled to the system.

The interfaces 402 are typically provided as interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 404 to efficiently perform routing computations, network diagnostics, security functions, etc.

The network device 400 can also include an integrated circuit 412, such as an application-specific integrated circuit (ASIC). The integrated circuit 412 can communicate with other components via the bus 410. The integrated circuit 412 can include logic for custom or specific operations, such as switching operations, management operations, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a system bus computing system architecture 500 wherein the components of the system are in electrical communication with each other using a bus 506. Exemplary system 500 includes a processing unit (CPU or processor) 504 and a system bus 506 that couples various system components including the system memory 520, such as read only memory (ROM) 518 and random access memory (RAM) 516, to the processor 504. The system 500 can include a cache of high-speed memory connected directly with, in close proximity to, or integrated as part of the processor 504. The system 500 can copy data from the memory 520 and/or the storage device 508 to the cache 502 for quick access by the processor 504. In this way, the cache 502 can provide a performance boost that avoids processor 504 delays while waiting for data. These and other modules can control or be configured to control the processor 504 to perform various actions. Other system memory 520 may be available for use as well. The memory 520 can include multiple different types of memory with different performance characteristics. The processor 504 can include any general purpose processor and a hardware module or software module, such as module 1 510, module 2 512, and module 3 514 stored in storage device 508, configured to control the processor 504 as well as a special-purpose processor where software instructions are incorporated into the actual processor design. The processor 504 may essentially be a completely self-contained computing system, containing multiple cores or processors, a bus, memory controller, cache, etc. A multi-core processor may be symmetric or asymmetric.

To enable user interaction with the computing device 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing device 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 516, read only memory (ROM) 518, and hybrids thereof.

The storage device 508 can include software modules 510, 512, 514 for controlling the processor 504. Other hardware or software modules are contemplated. The storage device 508 can be connected to the system bus 506. In one aspect, a hardware module that performs a particular function can include the software component stored in a computer-readable medium in connection with the necessary hardware components, such as the processor 504, bus 506, display 524, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 552, representative of any number of physically and/or logically distinct resources capable of executing software, firmware, and hardware configured to perform identified computations. Processor 552 can communicate with a chipset 554 that can control input to and output from processor 552. In this example, chipset 554 outputs information to output 562, such as a display, and can read and write information to storage device 564, which can include magnetic media, and solid state media, for example. Chipset 554 can also read data from and write data to RAM 566. A bridge 556 for interfacing with a variety of user interface components 558 can be provided for interfacing with chipset 554. Such user interface components 558 can include a keyboard, a microphone, touch detection and processing circuitry, a pointing device, such as a mouse, and so on. In general, inputs to system 550 can come from any of a variety of sources, machine generated and/or human generated.

Chipset 554 can also interface with one or more communication interfaces 560 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 552 analyzing data stored in storage 564 or 566. Further, the machine can receive inputs from a user via user interface components 558 and execute appropriate functions, such as browsing functions by interpreting these inputs using processor 552.

It can be appreciated that example systems 500 and 550 can have more than one processor or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method for device pass-through for virtual machines via a pass-through key, the method comprising:
   determining one or more respective configuration parameters associated with one or more network interfaces on a computing device;
   mapping the one or more respective configuration parameters to each corresponding network interface from the one or more network interfaces to yield a tag comprising a key and value pair of mapped interfaces-parameters, the key and value pair including the pass-through key with a label of the one or more network interfaces and a role of the one or more network interfaces;
   recording the tag to a data object accessible by one of the virtual machines on the computing device;
   configuring the one of the virtual machines to process the mapped interfaces-parameters as boot time parameters while launching;
   before launching the one of the virtual machines, identifying any applications and services requiring the tag; and
   launching the one of the virtual machines based on the mapped interfaces-parameters, the launching including binding the applications or the services to the one or more network interfaces based on the mapped interfaces-parameters.

2. The method of claim 1, wherein the data object comprises a file configured as a disk drive of the one of the virtual machines.

3. The method of claim 1,
   wherein,
     the one or more respective configuration parameters comprise respective network identification information, and
     the respective network identification information identifies a respective network associated with the corresponding network interface.

4. The method of claim 1,
   wherein,
     the key and value pair includes a value with a hardware address associated with the pass-through key to enable identification of the one or more network interfaces, and
     the pass-through key includes the label and the role of the one or more network interfaces.

5. The method of claim 4,
   wherein,
     the hardware address comprises a media access control address, and
     the label comprises a network name.

6. The method of claim 1,
   wherein,
     the one or more network interfaces comprise a first type of interface and a second type of interface, and
     the first type of interface and the second type of interface are configured for different types of roles or traffic.

7. The method of claim 6, wherein the key and value pair maps the corresponding network interface with data describing a respective one of the different types of roles or traffic.

8. The method of claim 7,
   wherein,
     the first type of interface comprises a management interface for management traffic or operations, and
     the second type of interface comprises a data interface for data traffic.

9. The method of claim 8,
   wherein,
     the key and value pair is associated with the first type of interface and maps a hardware address of the first type of interface with data describing that the first type of interface is the management interface for management of traffic or operations, and
     another key and value pair is associated with the second type of interface and maps another hardware address of the second type of interface with data describing that the second type of interface is the data interface for data traffic.

10. A system for device pass-through for a virtual machine on the system via a pass-through key, the system comprising:
    one or more processors; and
    at least one computer-readable storage medium having stored therein instructions which, when executed by the one or more processors, cause the one or more processors to perform operations comprising:
    determining one or more respective configuration parameters associated with one or more network interfaces associated with the system;
    mapping the one or more respective configuration parameters to each corresponding network interface from the one or more network interfaces to yield a tag comprising a key and value pair of mapped interfaces-parameters, the key and value pair including the pass-through key with a label of the one or more network interfaces and a role of the one or more network interfaces;
    recording the tag to a data object accessible by the virtual machine on the system;
    configuring the virtual machine to process the mapped interfaces-parameters as boot time parameters while launching;
    before launching the one of the virtual machines, identifying any applications and services requiring the tag; and
launching the virtual machine based on the mapped interfaces-parameters, the launching including binding the applications or the services to the one or more network interfaces based on the mapped interfaces-parameters.

11. The system of claim 10,
wherein,
    the one or more respective configuration parameters comprise respective network identification information, and
    the respective network identification information identifies a respective network associated with the corresponding network interface.

12. The system of claim 11,
wherein,
    the mapped interfaces-parameters comprise a key and value pair with a key and a value,
    the key and value pair includes a value with a hardware address associated with the pass-through key to enable identification of the one or more network interfaces, and
    the pass-through key includes the label and the role of the one or more network interfaces.

13. The system of claim 12,
wherein,
    the hardware address comprises a media access control address, and
    the label comprises a network name.

14. The system of claim 10,
wherein,
    the one or more network interfaces comprise a first type of interface and a second type of interface, and
    the first type of interface and the second type of interface are configured for different types of roles or traffic.

15. The system of claim 14,
wherein,
    the key and value pair maps the corresponding network interface with data describing a respective type of interface of the corresponding network interface, and
    the respective type of interface comprises one of a management interface for management traffic or operations or a data interface for data traffic.

16. A non-transitory computer-readable storage medium having stored therein instructions which, when executed by a processor, cause the processor to perform operations for device pass-through for a virtual machine on a computing device via a pass-through key, the operations comprising:
    determining one or more respective configuration parameters associated with one or more network interfaces on the computing device;
    mapping the one or more respective configuration parameters to each corresponding network interface from the one or more network interfaces to yield a tag comprising a key and value pair of mapped interfaces-parameters, the key and value pair including the pass-through key with a label of the one or more network interfaces and a role of the one or more network interfaces;
    recording the tag to a data object accessible by the virtual machine on the computing device;
    configuring the virtual machine to process the mapped interfaces-parameters as boot time parameters while launching;
    before launching the one of the virtual machines, identifying any applications and services requiring the tag; and
    launching the virtual machine based on the mapped interfaces-parameters, the launching including binding the applications or the services to the one or more network interfaces based on the mapped interfaces-parameters.

17. The non-transitory computer-readable storage medium of claim 16, wherein the data object comprises a file configured as a disk drive of the virtual machine.

18. The non-transitory computer-readable storage medium of claim 16,
wherein,
    the mapped interfaces-parameters comprise a key and value pair with a key and a pair,
    the key and value pair includes a value with a hardware address associated with the pass-through key to enable identification of the one or more network interfaces, and
    the pass-through key includes the label and the role of the one or more network interfaces.

19. The non-transitory computer-readable storage medium of claim 16,
wherein,
    the one or more network interfaces comprise a first type of interface and a second type of interface,
    the first type of interface and the second type of interface are configured for different types of roles or traffic, and
    the key and value pair maps the corresponding network interface with data describing a respective one of the different types of roles or traffic.

20. The non-transitory computer-readable storage medium of claim 19,
wherein,
    the key and value pair is associated with the first type of interface and maps a hardware address of the first type of interface with data describing that the respective one of the different types of roles or traffic associated with the first type of interface comprises a management role or traffic for management of traffic or operations, and
    another key and value pair is associated with the second type of interface and maps another hardware address of the second type of interface with data describing that the respective one of the different types of roles or traffic associated with the second type of interface comprises a data traffic role or traffic for data traffic.

* * * * *